United States Patent [19]
Bivens et al.

[11] Patent Number: 5,829,851
[45] Date of Patent: Nov. 3, 1998

[54] FLOATING GEAR DAMPER

[75] Inventors: Steven L. Bivens, Kankakee; Ralph G. Nedbel, Orland Park, both of Ill.

[73] Assignee: Illinois Tool Works Inc., Glenview, Ill.

[21] Appl. No.: 773,147

[22] Filed: Dec. 30, 1996

Related U.S. Application Data

[63] Continuation of Ser. No. 439,882, May 12, 1995, Pat. No. 5,658,058.

[51] Int. Cl.⁶ .................................................... A47B 88/00
[52] U.S. Cl. .......................................... 312/331; 74/89.17
[58] Field of Search ................................ 74/89.17, 89.18, 74/89.19, 422, DIG. 10; 312/331

[56] References Cited

U.S. PATENT DOCUMENTS

| | | | |
|---|---|---|---|
| 1,640,864 | 8/1927 | Ungerman | 74/89.17 |
| 4,723,456 | 2/1988 | Kohler et al. | 74/89.18 |
| 4,925,258 | 5/1990 | Ludwig et al. | 312/331 |

*Primary Examiner*—Peter M. Cuomo
*Assistant Examiner*—Gerald Anderson
*Attorney, Agent, or Firm*—Schwartz & Weinrieb

[57] ABSTRACT

A gear damper includes anti-ratcheting means for preventing disengagement between a gear of the damper and a mating gear rack when a sliding or rotating tray is moved or rotated in and out of a stationary housing. The gear damper further includes mounting means so as to permit the gear damper to move floatingly in a direction perpendicular to the gear rack as a toothed wheel gear follows the gear rack. As a result, the distance between the toothed gear of the damper and the gear rack is held substantially constant so as to eliminate ratcheting and gear skipping.

20 Claims, 2 Drawing Sheets

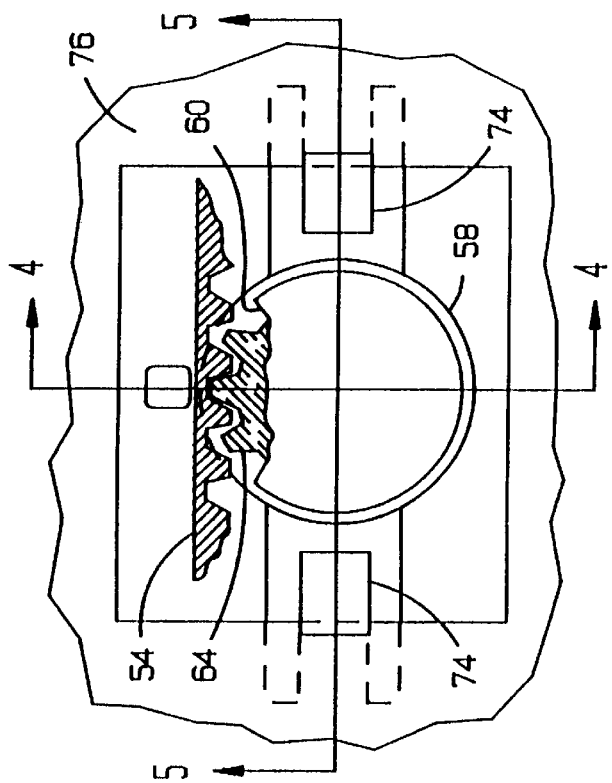
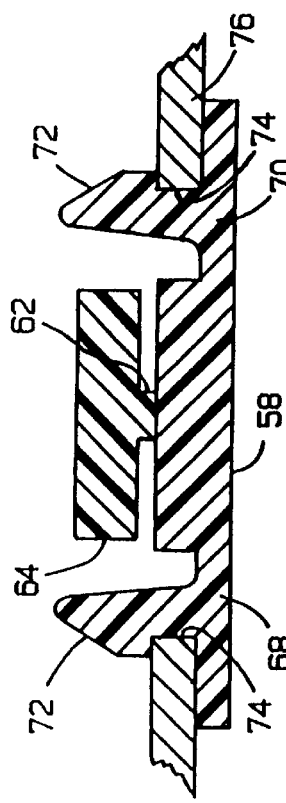
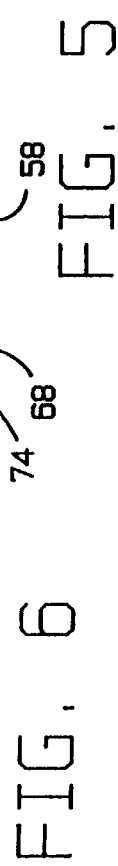
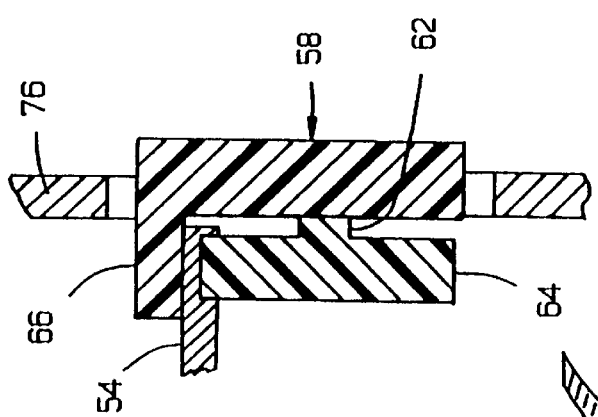
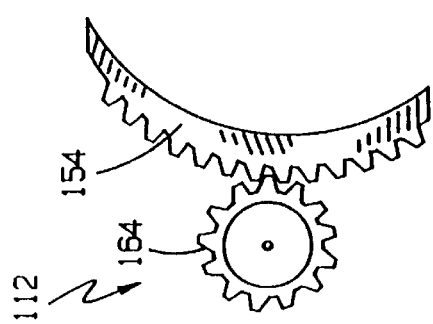

FLOATING GEAR DAMPER

This patent application is a Divisional patent application of prior patent application Ser. No. 08/439,882 filed May 12, 1995, now U.S. Pat. No. 5,658,058.

FIELD OF THE INVENTION

This invention relates generally to rotary oil-type damper devices for dampening the opening of an openable object such as an ashtray, cupholder, glove compartment door, or the like relative to a main body. More particularly, the present invention relates to a floating gear damper of a unique construction which includes anti-ratcheting guide means for preventing disengagement between a gear of the damper and a mating gear rack when a sliding tray is moved in and out of a stationary housing or a rotating tray is rotated in and out of the stationary housing.

BACKGROUND OF THE INVENTION

It is generally known in the art that a rotary oil-type damper device can be incorporated as a mechanism for controlling the opening and closing of doors and drawers in order to absorb the shock imparted by an external force. For example, when the openable object is a sliding ashtray installed in the dashboard of an automotive vehicle the sudden impact opening may cause the contents therein to be tossed or scattered all over the passenger, seat and floor of the vehicle. In order to avoid this type of problem, there has been provided in the prior art, rotary damper devices for absorbing the impact created between the main body and the openable object.

These prior art rotary damper devices typically include a stationary housing and a rotor having a toothed wheel gear. The toothed wheel gear is generally adapted for mesh engagement with a gear rack fixed to a portion of the openable object (that is, a sliding or rotating ashtray). The stationary housing is adapted to be attached to the main body (stationary ashtray housing). In operation, the damper device is normally statically fixed to a panel with the gear on the damper device being held against the mating gear rack. As a result, these prior art damper devices suffer from the problem of ratcheting or gear skipping where the gear rack separates away from the gear of the damper device. This can be caused by a number of factors, such as molding variations, problems in manufacturing of the parts, heating cycles and the like. If the distance between the damper gear and the mating gear rack is too small, there is produced added friction between the component parts which may render binding and possible premature damper failure. On the other hand, when the distance between the damper gear and the gear rack is too large, there is caused the ratcheting or gear skipping problem.

Furthermore, since these component parts are generally made of plastic they will have varying dimensions due to ambient temperature changes. In addition, the component parts may be warped during the course of prolonged use thereby creating the problem of misalignment. As a result, the damper device will again experience a failure in its operation.

It would therefore be desirable to provide a floating gear damper of a unique construction like that of the present invention which includes anti-ratcheting guide means for preventing disengagement between a gear of the damper and a mating gear rack when a sliding or rotating tray is moved or rotated in and out of a stationary housing. It would also be expedient to provide the damper with an improved mounting means so as to permit it to float as the damper gear follows the gear rack. The floating gear damper of the present invention represents a significant improvement over the prior art rotary dampening devices.

OBJECTS OF THE INVENTION

Accordingly, it is a general object of the present invention to provide a floating gear damper having anti-ratcheting means which is relatively simple and economical to manufacture and assemble, but overcomes the disadvantages of the prior art dampening devices.

It is an object of the present invention to provide an improved gear damper which includes anti-ratcheting guide means for preventing disengagement between a gear of the damper and a mating gear rack when a sliding or rotating tray is moved or rotated in and out of a stationary housing.

It is another object of the present invention to provide an improved gear damper which includes mounting means so as to permit it to float as the damper gear follows the gear rack.

SUMMARY OF THE INVENTION

In accordance with these aims and objectives, there is provided in a preferred embodiment of the present invention an improved gear damper for use in a damper assembly which includes a stationary housing, a sliding tray, and anti-ratcheting means for preventing disengagement between a toothed wheel gear and a gear rack when the sliding tray is moved in and out of the stationary housing. The stationary housing is formed of a pair of side walls, a top wall, and a rear wall so as to define an interior cavity. The sliding tray is formed of a pair of side walls, a rear wall, and a front wall for receiving a receptacle. The interior cavity of the stationary housing slidably receives the sliding tray for movement between a first position and a second position.

The sliding tray has at least one mating gear rack disposed on its bottom side. The gear damper is formed of a stator housing and a rotor. The rotor has a shaft disposed on its exterior surface for receiving a toothed wheel gear. The toothed wheel gear is disposed so as to be in mesh engagement with the gear rack. The anti-ratcheting means includes a guide post formed integrally on the stationary housing. The mating gear rack is sandwiched between the toothed wheel gear and the guide post so as to maintain the toothed wheel gear in continuous contact with the mating gear rack. As a result, the distance between the toothed wheel gear of the damper and the gear rack is held substantially constant so as to eliminate ratcheting and gear skipping.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, and wherein:

FIG. 3 is an enlarged view of the area A of FIG. 2, illustrating the details of one of the floating gear dampers;

FIG. 4 is a cross-sectional view, taken along the lines 4—4 of FIG. 3;

FIG. 5 is a cross-sectional view, taken along the lines 5—5 of FIG. 3; and

FIG. 6 is a fragmentary view of the floating damper of the present invention in meshed engagement with an arcuate-shaped gear rack.

DESCRIPTION OF THE PREFERRED EMBODIMENT

Figures 1, 2:
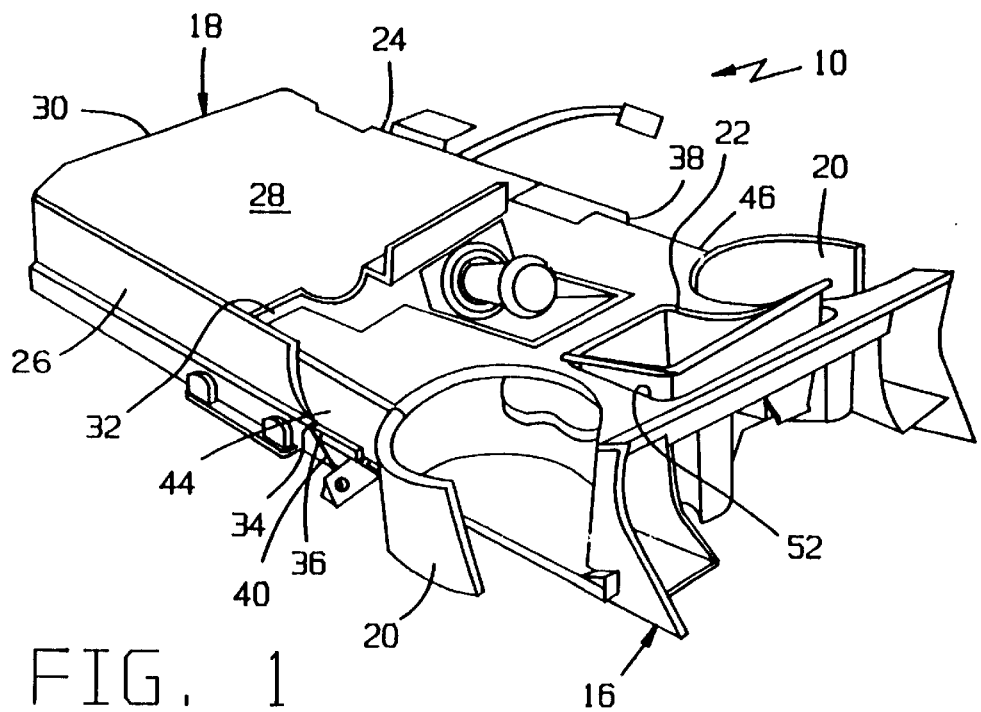
FIG. 1 is a top perspective view of an automotive vehicle cupholder/ashtray housing and sliding tray in the extended position incorporating the floating gear damper of the present invention.
FIG. 2 is a bottom perspective view, similar to FIG. 1.

Referring now in detail to the various views of the drawings and in particular to FIGS. 1 and 2, there is shown a damper assembly 10 which incorporates two floating gear dampers 12 of the present invention. Each gear damper 12 includes an anti-ratcheting guide means 14 for preventing disengagement between a gear 64 of the damper 12 and a mating gear rack 54 when an openable object such as a sliding cupholder/ashtray 16 is moved into and out of a main body such as a stationary cupholder/ashtray housing 18 mounted in a dashboard of an automotive vehicle (not shown).

As can best be seen from FIG. 1, the sliding tray 16 is adapted to hold a pair of cup-like receptacles 20 and an ashtray receptacle 22 disposed between the cup-like receptacles 20. The floating gear dampers 12 cause the sliding cupholder/ashtray 16 containing the ashtray receptacle 22 to be gently or smoothly pushed out (opened) at a dampened or controlled rate of speed when activated and to be pushed in (closed) at the dampened rate of speed with the same force.

The stationary cupholder/ashtray housing 18 is formed so as to have a generally rectangular configuration and includes a pair of side walls 24 and 26, a top wall 28, and a rear wall 30 so as to define an interior cavity 32 for receiving the sliding cupholder/ashtray 16 with the ashtray receptacle 22 secured therein. Each of the opposed side walls 24 and 26 is provided on its interior surface with a pair of parallel spaced-apart rails 34 and 36 protruding therefrom. The rails 34 and 36 on the side wall 24 are in vertical alignment with the corresponding rails on the side wall 26.

The rails 34 and 36 of the respective side walls 24 and 26 extend longitudinally from the rear wall 30 of the stationary housing 18 to the open front end 38 thereof. Further, there are provided corresponding channels 40 and 42 defined by the parallel rails 34 and 36 on each side of the side walls 24, 26 for slidably supporting the sliding cupholder/ashtray 16 with minimal friction during its forward movement in a first direction and rearward movement in a second direction.

As can also be seen from FIGS. 1 and 2 of the drawings, the sliding cupholder/ashtray 16 is likewise formed so as to have a generally rectangular shape and includes a pair of side walls 44 and 46, a rear wall 48, and a front wall 50. Adjacent to the front wall 50, there is provided a central opening 52 for receiving the ashtray receptacle 22. On the bottom side of the sliding tray 16, there is provided a pair of gear racks 54 and 56 disposed parallel to and spaced-apart from each other. Each of the gear racks 54, 56 extends longitudinally and substantially the entire length between the rear wall 48 and the front wall 50 of the sliding tray 16. It will be noted that the toothed front side of the gear racks 54, 56 face the center of the sliding tray 16 and the back side thereof faces the respective side walls 24, 26 of the sliding tray 16.

Since the two gear dampers 12 are identical, it will be sufficient to describe the construction and operation of only one of them. Accordingly, the floating gear damper depicted generally in the lower portion of FIG. 2 is shown in detail in FIGS. 3 through 5 for causing the sliding tray 16 to be gently and smoothly pushed out (opened) at a dampened or controlled rate of speed when activated and to be pushed in (closed) at the dampened rate of speed with the same force.

The floating gear damper 12 of the present invention is molded from a plastic material and is comprised of a cylindrically-shaped stator housing 58 and a rotor 60. The rotor 60 has a shaft 62 disposed on its exterior surface for receiving a toothed wheel gear 64. The toothed wheel gear 64 of the damper 12 is disposed so as to be in meshed engagement with the gear rack 54 operatively connected to the bottom side of the sliding tray 16. As a result, upon movement of the sliding tray 16 out of the stationary housing 18, the rotor 60 rotates about its axis with a braking force being applied as the toothed gear 64 rolls smoothly on the gear rack 54.

Further, the outer surface of the stator housing 58 is formed integrally with a boss or guide post 66. The guide post 66 is preferably molded directly to the surface of the stator housing 58 which contactly engages the back side of the gear rack 54. As a result, the mating gear rack 54 is sandwiched between the toothed,wheel gear 64 of the damper 12 and the guide post 66 so as to maintain the toothed gear 16 in continuous contact with the mating gear rack 54. In other words, the distance between the base of the damper toothed gear 64 and the front side of the mating gear rack 54 is maintained to be substantially constant. If the guide post 66 was omitted, the distance between the damper gear 64 and the mating gear rack 54 would be susceptible to variations which may either cause added friction, binding, and possible premature damper failure on the one hand, or cause ratcheting and gear skipping on the other hand. Thus, it can be seen that the guide post 66 cooperates with the back side of the gear rack 54 to define the anti-ratcheting system of the present invention.

The stator housing 58 further includes a pair of diametrically opposed wing-like portions 68 and 70. Each of the wing-like portions 68, 70 terminates in a locking, flexible prong 72 or projection 72. The flexible prongs are adapted to snappingly engage and lock into elliptically-shaped opposed slots 74 formed in a mounting panel 76 so as to securely fix the floating gear damper 12 to the panel 26 as illustrated in FIG. 5. It will be noted that the mounting panel 76 is fixedly secured to the bottom side of the stationary housing 18. Accordingly, it should be understood that the flexible prongs 72 cooperate with the opposed slots 74 in the panel 76 defining mounting means so as to allow the damper 12 to float as the toothed wheel gear 64 follows the gear rack 54. In other words, the flexible prongs 72 of the gear damper 12 are allowed to move floatingly in a direction perpendicular to the gear rack 54. In this manner, the prior art problems of added friction, misalignment, warping and/or ratcheting are completely eliminated.

In FIG. 6, there is shown a fragmentary view of a second embodiment of the floating gear damper 112 of the present invention. In particular, the toothed wheel gear 164 of the floating damper 112 is in meshed engagement with an arcuate-shaped gear rack 154 which can be operatively connected to a rotating tray (not shown) for rotation into and out of a stationary housing.

From the foregoing detailed description, it can thus be seen that the present invention provides an improved gear damper which includes anti-ratcheting means for preventing disengagement between a toothed wheel gear and a gear rack when a sliding or rotating tray is moved or rotated in and out of a stationary housing. Further, there is provided mounting means for permitting a gear damper to move floatingly in a direction perpendicular to the gear rack as the toothed wheel gear follows the gear rack.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A gear damper, comprising:

a fixed stator housing;

at least one gear rack movably disposed with respect to said fixed stator housing between first and second positions;

a rotor rotatably mounted upon said fixed stator housing and having a toothed gear mounted thereon for meshed engagement with said at least one gear rack; and anti-ratcheting means integral with said fixed stator housing for preventing disengagement of said toothed gear from said at least one gear rack while said at least one gear rack is moved with respect to said fixed stator housing between said first and second positions such that the distance defined between said toothed gear of said rotor and said at least one gear rack is maintained substantially constant so as to eliminate ratcheting and gear skipping.

2. A gear damper as set forth in claim 1, wherein:

said anti-ratcheting means comprises a guide post integral with said stator housing and spaced from said toothed gear of said rotor, such that said at least one gear rack is interposed between said toothed gear of said rotor and said guide post of said stator housing, whereby said guide post of said stator housing cooperates with said toothed gear of said rotor so as to maintain said toothed gear of said rotor in continuous contact with said at least one gear rack.

3. A gear damper as set forth in claim 1, further comprising:

a second stator housing, and a second rotor, comprising a second toothed gear, rotatably mounted upon said second stator housing; and said at least one gear rack comprises a pair of gear racks disposed in a parallel, spaced-apart relationship wherein one of said pair of gear racks is respectively enmeshed with one of said toothed gears of said rotor and said second rotor.

4. A gear damper as claimed in claim 1, further comprising:

a support panel having slot means defined therein; and said stator housing comprises a pair of diametrically opposite wing-like portions each terminating in a flexible prong for snap-engagement within said slot means defined within said support panel.

5. A gear damper as set forth in claim 1, wherein:

said at least one gear rack has a linear configuration.

6. A gear damper as set forth in claim 1, wherein:

said at least one gear rack has an arcuate configuration.

7. A gear damper, comprising:

a fixed stator housing;

at least one gear rack movably disposed with respect to said fixed stator housing between first and second positions;

a rotor rotatably mounted upon said fixed stator housing and having a toothed gear mounted thereon for meshed engagement with said at least one gear rack; and anti-ratcheting means integral with said fixed stator housing for maintaining said at least one gear rack in continuous contact with said toothed gear of said rotor while said at least one gear rack is moved with respect to said fixed stator housing between said first and second positions such that the distance defined between said toothed gear of said rotor and said at least one gear rack is maintained substantially constant so as to eliminate ratcheting and gear skipping.

8. A gear damper as set forth in claim 7, wherein:

said anti-ratcheting means comprises a guide post integral with said stator housing and spaced from said toothed gear of said rotor, such that said at least one gear rack is interposed between said toothed gear of said rotor and said guide post of said stator housing, whereby said guide post of said stator housing cooperates with said toothed gear of said rotor so as to maintain said toothed gear of said rotor in continuous contact with said at least one gear rack.

9. A gear damper as set forth in claim 7, further comprising:

a second stator housing, and a second rotor, comprising a second toothed gear, rotatably mounted upon said second stator housing; and said at least one gear rack comprises a pair of gear racks disposed in a parallel, spaced-apart relationship wherein one of said pair of gear racks is respectively enmeshed with one of said toothed gears of said rotor and said second rotor.

10. A gear damper as claimed in claim 7, further comprising:

a panel member having slot means defined therein; and said stator housing comprises a pair of diametrically opposite wing-like portions each terminating in a flexible prong for snap-engagement within said slot means defined within said panel member.

11. A gear damper as set forth in claim 7, wherein:

said at least one gear rack has a linear configuration.

12. A gear damper as set forth in claim 7, wherein:

said at least one gear rack has an arcuate configuration.

13. A gear damper as set forth in claim 7, wherein:

said gear damper is fabricated from a plastic material.

14. A gear damper, comprising:

a fixed stator housing;

at least one gear rack movably disposed with respect to said fixed stator housing between a first position and a second position;

a rotor rotatably mounted upon said fixed stator housing and having a toothed gear mounted thereon for meshed engagement with said at least one gear rack; and anti-ratcheting means integral with said fixed stator housing for maintaining said at least one gear rack enmeshed with said toothed gear of said rotor while said at least one gear rack is moved with respect to said fixed stator housing between said first and second positions such that the distance defined between said toothed gear of said rotor and said at least one gear rack is maintained substantially constant so as to eliminate ratcheting and gear skipping.

15. A gear damper as claimed in claim 14, wherein said gear damper is molded from a plastic material.

16. A gear damper as set forth in claim 14, wherein:

said at least one gear rack has a linear configuration.

17. A gear damper as set forth in claim 14, wherein:

said at least one gear rack has an arcuate configuration.

18. A gear damper as set forth in claim 14, further comprising:

a second stator housing, and a second rotor, comprising a second toothed gear, rotatably mounted upon said second stator housing; and said at least one gear rack comprises a pair of gear racks disposed in a parallel, spaced-apart relationship wherein one of said pair of gear racks is respectively enmeshed with one of said toothed gears of said rotor and said second rotor.

19. A gear damper as claimed in claim 14, wherein said anti-ratcheting means includes a guide post formed integrally on said stator housing, said gear rack being sandwiched between said toothed gear and said guide post so as to maintain said toothed gear in continuous contact with said gear rack.

20. A gear damper as claimed in claim 19, further comprising:

a stationary housing having slot means defined therein; and said stator housing comprising a pair of diametrically opposed wing-like portions each terminating in a flexible prong for snap-engagement within said slot means defined within said stationary housing.

\* \* \* \* \*